(12) United States Patent
Inoue et al.

(10) Patent No.: US 11,561,789 B2
(45) Date of Patent: Jan. 24, 2023

(54) SOFTWARE UPDATE DEVICE, VEHICLE, AND SOFTWARE UPDATE METHOD

(71) Applicant: HONDA MOTOR CO., LTD., Tokyo (JP)

(72) Inventors: Genta Inoue, Wako (JP); Yosuke Shionoya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/432,353

(22) PCT Filed: Feb. 22, 2019

(86) PCT No.: PCT/JP2019/006680
§ 371 (c)(1),
(2) Date: Aug. 19, 2021

(87) PCT Pub. No.: WO2020/170407
PCT Pub. Date: Aug. 27, 2020

(65) Prior Publication Data
US 2022/0326932 A1    Oct. 13, 2022

(51) Int. Cl.
*G06F 8/65* (2018.01)
*B60R 16/023* (2006.01)

(52) U.S. Cl.
CPC .............. *G06F 8/65* (2013.01); *B60R 16/023* (2013.01)

(58) Field of Classification Search
CPC .................................. G06F 8/65; B60R 16/023
See application file for complete search history.

(56) References Cited

U.S. PATENT DOCUMENTS

| | | | |
|---|---|---|---|
| 8,412,921 B2 | 4/2013 | Fislage | |
| 2015/0113521 A1* | 4/2015 | Suzuki | G06F 8/65 717/173 |
| 2018/0018160 A1 | 1/2018 | Teraoka et al. | |
| 2018/0074811 A1 | 3/2018 | Kiyama et al. | |

(Continued)

FOREIGN PATENT DOCUMENTS

| | | |
|---|---|---|
| CN | 102124447 A | 7/2011 |
| JP | 2015-079468 A | 4/2015 |

(Continued)

OTHER PUBLICATIONS

Program update system, program update method, and computer program, WO 2017149825, Takayuki Nakano, (Year: 2017).*

(Continued)

*Primary Examiner* — Kim T Nguyen
(74) *Attorney, Agent, or Firm* — Carrier Shende & Associates, P.C.; Fulchand P. Shende; Joseph P. Carrier

(57) ABSTRACT

A software update device is provided with an update control unit that performs a software update using a new software version supplied over a network. The update control unit installs a first new software version on a first electronic control device prior to installing a second new software version on a second electronic control device, and activates the first new software version installed on the first electronic control device either after activation of the second new software version installed on the second electronic control device has started or after it is ascertained that activation of the second new software version installed on the second electronic control device has been normally completed.

16 Claims, 11 Drawing Sheets

(56) References Cited

U.S. PATENT DOCUMENTS

| | | | |
|---|---|---|---|
| 2018/0341476 A1* | 11/2018 | Kitao | .......... H04L 67/1097 |
| 2019/0250902 A1 | 8/2019 | Tateishi | |
| 2020/0059383 A1 | 2/2020 | Kawauchi et al. | |
| 2020/0225930 A1 | 7/2020 | Teraoka et al. | |

FOREIGN PATENT DOCUMENTS

| | | |
|---|---|---|
| JP | 6147791 B2 | 6/2017 |
| JP | 6147792 B2 | 6/2017 |
| JP | 6216730 B2 | 10/2017 |
| JP | 2018-037022 A | 3/2018 |
| JP | 2018-045515 A | 3/2018 |
| JP | 2018-063659 A | 4/2018 |
| JP | 2018-133721 A | 8/2018 |
| JP | 2018-200510 A | 12/2018 |
| WO | 2017/149825 A1 | 9/2017 |

OTHER PUBLICATIONS

PCT/ISA/210 from International Application PCT/JP2019/006680 and the English translation thereof.
Office Action including search report dated Oct. 19, 2022 issued over the corresponding Chinese Patent Application No. 201980092770.4 with the English translation of the Office Action's pertinent portion.

* cited by examiner

SOFTWARE UPDATE DEVICE, VEHICLE, AND SOFTWARE UPDATE METHOD

TECHNICAL FIELD

The present invention relates to a software updating apparatus (software update device), a vehicle, and a software updating method (software update method).

BACKGROUND ART

JP 2018-045515 A discloses technology for updating software of a control apparatus using updating software distributed from a server.

SUMMARY OF INVENTION

However, there is a desire for technology capable of more favorably performing the update of the software.

It is an objective of the present invention to provide a software updating apparatus, a vehicle, and a software updating method that are capable of more favorably performing the update of the software.

A software updating apparatus according to an aspect of the present invention includes an acquiring section configured to acquire new-version software supplied via a network; and an update control section configured to perform a software update for each of a plurality of electronic control units mounted in a vehicle, using the new-version software acquired by the acquiring section, wherein a first electronic control unit among the plurality of electronic control units includes a storage-capable region in which first new-version software, for updating first old-version software installed in the first electronic control unit, is allowed to be installed in a background, and wherein the update control section performs installation of the first new-version software in the storage-capable region of the first electronic control unit in the background before installation of second new-version software in a second electronic control unit among the plurality of electronic control units, and after activation of the second new-version software installed in the second electronic control unit is started or after it is found that the activation of the second new-version software installed in the second electronic control unit will be completed normally, the update control section activates the first new-version software installed in the storage-capable region of the first electronic control unit.

A software updating apparatus according to another aspect of the present invention includes an acquiring section configured to acquire new-version software supplied via a network, and an update control section configured to perform a software update for each of a plurality of electronic control units included in a vehicle, using the new-version software acquired by the acquiring section, wherein a first electronic control unit among the plurality of electronic control units includes a storage-capable region in which first new-version software, for updating first old-version software installed in the first electronic control unit, is allowed to be installed in a background, wherein a second electronic control unit among the plurality of electronic control units does not include a storage-capable region in which second new-version software, for updating second old-version software installed in the second electronic control unit, is allowed to be installed in the background, and wherein when a main power source of the vehicle is ON, the update control section performs installation of the first new-version software in the storage-capable region of the first electronic control unit in the background, and then, when the installation of the first new-version software in the storage-capable region of the first electronic control unit has been completed and the main power source of the vehicle is turned OFF, the update control section performs installation of the second new-version software in the second electronic control unit, and then, after the installation of the second new-version software in the second electronic control unit has been completed, the update control section activates the first new-version software installed in the storage-capable region of the first electronic control unit and the second new-version software installed in the second electronic control unit.

A vehicle according to still another aspect of the present invention includes the software updating apparatus described above.

A software updating method according to still another aspect of the present invention, for performing a software update for each of a plurality of electronic control units included in a vehicle, by using new-version software supplied via a network, wherein a first electronic control unit among the plurality of electronic control units includes a storage-capable region in which first new-version software, for updating first old-version software installed in the first electronic control unit, is allowed to be installed in a background, the method includes a step of installing the first new-version software in the storage-capable region of the first electronic control unit in the background, a step of installing, when the installation of the first new-version software in the storage-capable region of the first electronic control unit has been completed and a main power source of the vehicle is turned OFF, second new-version software in a second electronic control unit among the plurality of electronic control units, and a step of activating, after activation of the second new-version software installed in the second electronic control unit is started or after it is found that the activation of the second new-version software installed in the second electronic control unit will be completed normally, the first new-version software installed in the storage-capable region of the first electronic control unit.

According to the present invention, it is possible to provide a software updating apparatus, a vehicle, and a software updating method that are capable of more favorably performing the update of the software.

DESCRIPTION OF EMBODIMENTS

The following describes in detail preferred embodiments of a software updating apparatus, a vehicle, and a software updating method according to the present invention, while referencing the accompanying drawings.

Embodiment

Figure 1:
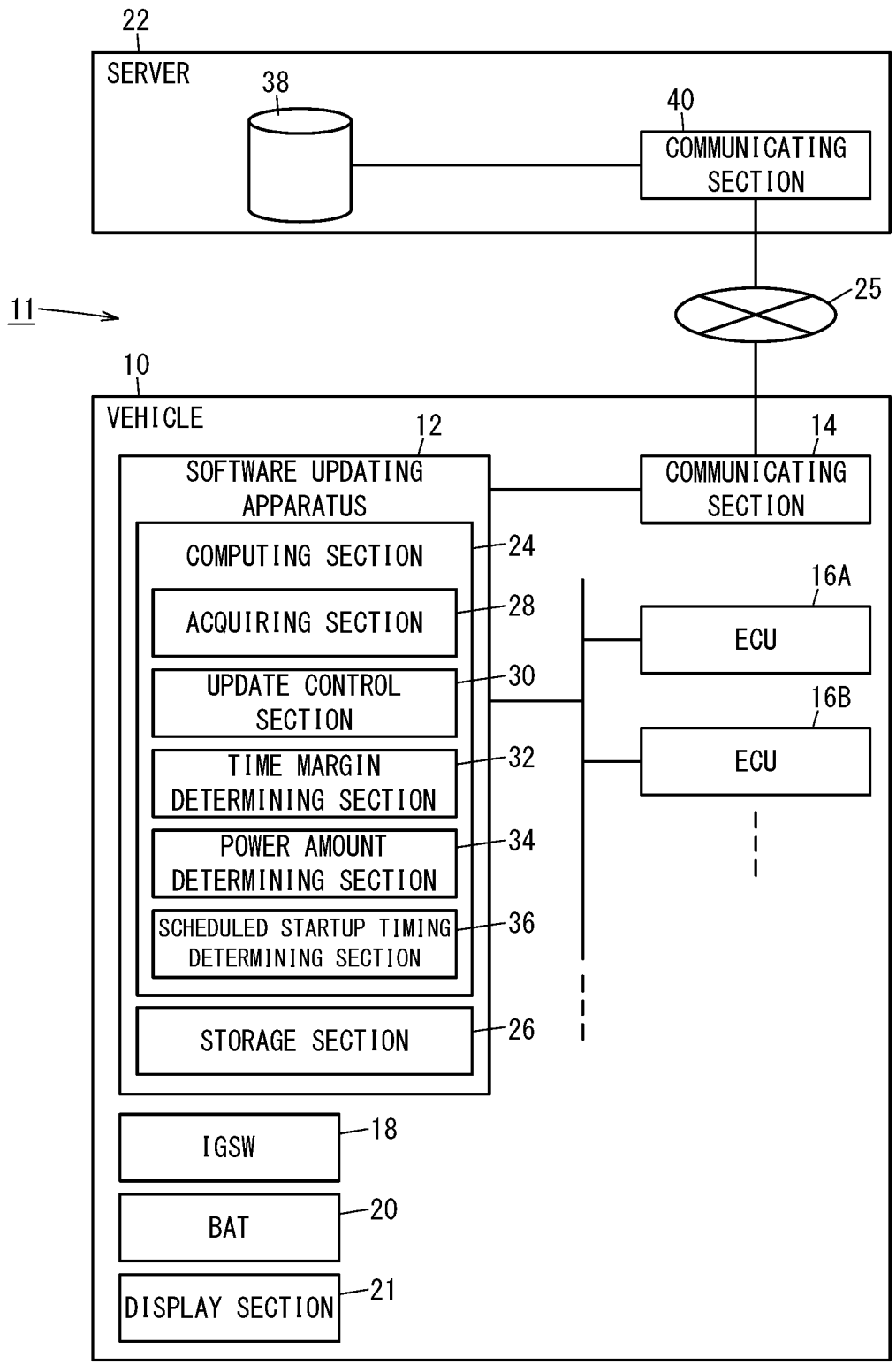
FIG. 1 is a block diagram showing a software updating system including a software updating apparatus according to an embodiment.

A software updating apparatus, a vehicle, and a software updating method according to one embodiment will be described with reference to the drawings. FIG. 1 is a block diagram illustrating a software updating system including a software updating apparatus according to the present embodiment.

A software updating system 11 according to the present embodiment includes a vehicle 10 and a server (external device) 22.

The vehicle 10 includes a software updating apparatus 12, a communicating section 14, electronic control units (ECUs) 16, an ignition switch (IGSW) 18, a battery (BAT) 20, and a display section 21. The reference numeral 16 is used when describing an electronic control unit in general, and the reference numerals 16A and 16B are used when describing individual electronic control units. The vehicle 10 includes a large number of electronic control units 16, and FIG. 1 illustrates two of the large number of electronic control units 16. That is, FIG. 1 illustrates a first electronic control unit 16A and a second electronic control unit 16B among the large number of electronic control units 16. Here, an example is described of a case in which the first electronic control unit 16A and the second electronic control unit 16B operate cooperatively (operate in synchronization). The vehicle 10 also includes configurational elements other than the configurational elements mentioned above, but descriptions thereof are omitted here.

The server 22 includes a database 38 and a communicating section 40. The communicating section 40 can perform wireless communication with the communicating section 14 included in the vehicle 10. New-version software (update software) for updating the software (old-version software or current software) installed in the electronic control units 16 can be stored in the database 38. The server 22 also includes configurational elements other than the configurational elements mentioned above, but descriptions thereof are omitted here.

The communicating section 14 can perform wireless communication with the communicating section 40 included in the server 22, via a network 25. The network 25 is the Internet, for example, but is not limited to this. The communicating section 14 may be a communicating section that can perform cellular communication, or may be a communicating section that can perform wireless LAN communication. The communicating section 14 can receive the new-version software supplied from the server 22 via the network 25.

The software updating apparatus 12 includes a computing section 24 and a storage section 26. The computing section 24 performs overall control of the software updating apparatus 12. The computing section 24 is formed by a CPU (Central Processing Unit), for example. The computing section 24 performs update control of the software (firmware) by controlling each section based on a program stored in the storage section 26. The storage section 26 includes a volatile memory (not shown in the drawings) and a nonvolatile memory (not shown in the drawings). The new-version software downloaded from the server 22 can be temporarily stored in the storage section 26.

The computing section 24 includes an acquiring section 28, an update control section 30, a time margin determining section 32, a power amount determining section 34, and a scheduled startup timing determining section 36. The acquiring section 28, the update control section 30, the time margin determining section 32, the power amount determining section 34, and the scheduled startup timing determining section 36 can be realized by the computing section 24 executing the program stored in the storage section 26.

The acquiring section 28 acquires the new-version software (software) supplied from the server 22 via the network 25. More specifically, the acquiring section 28 acquires the new-version software received by the communicating section 14.

The update control section 30 performs an update of the software for each of the plurality of electronic control units 16 mounted in the vehicle 10, by using the new-version software acquired by the acquiring section 28.

Here, an example is described of a case in which first old-version software (first current software) is installed in the first electronic control unit 16A. Furthermore, the example described here is a case in which second old-version software (second current software) is installed in the second electronic control unit 16B. The example described here is a case in which the first old-version software installed in the first electronic control unit 16A is updated by first new-version software supplied from the server 22. Furthermore, the example described here is a case in which the second old-version software installed in the second electronic control unit 16B is updated by second new-version software supplied from the server 22.

Figure 2A:
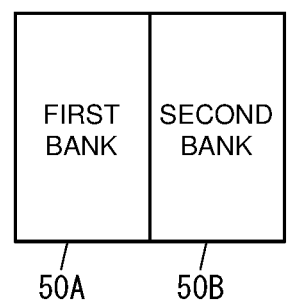
FIGS. 2A and 2B schematically show an example of a configuration of a nonvolatile memory.

The storage capacity of the nonvolatile memory (not shown in the drawings) included in the first electronic control unit 16A is relatively high. FIG. 2A schematically illustrates an example of a configuration of the nonvolatile memory included in the first electronic control unit 16A. The first electronic control unit 16A includes a plurality of nonvolatile memory chips. Here, an example is described of a case in which two nonvolatile memory chips are included. That is, in this example, a case where a first memory chip and a second memory chip are provided will be described. The first memory chip is mounted on one surface of a substrate (not shown in the drawings), for example. The second memory chip is mounted on the other surface of the substrate, for example. The first memory chip forms a first bank (first memory bank or first storage location) 50A. The second memory chip forms a second bank (second memory bank or second storage location) 50B. Such a configuration is referred to as a double bank. In the first electronic control unit 16A, in a state where the first old-version software is installed in the first bank 50A, for example, it is possible to install the first new-version software in the second bank 50B. That is, the second bank 50B can function as a buffer when installing the first new-version software. In other words, the second bank 50B can function as a storage-capable region (installation-capable region) in which the first new-version software can be installed in the background. Here, an example is described of a case in which the first electronic control unit 16A includes a plurality of memory chips, but the present invention is not limited to this. The first electronic control unit 16A may instead include a single high-capacity memory chip. The first bank 50A and the second bank 50B may be included in the single high-capacity memory chip.

The first electronic control unit 16A is an electronic control unit having a display control function, for example, but is not limited to this. More specifically, the first electronic control unit 16A is an ECU for in-vehicle infotainment (IVI), an ECU for a meter display section, or the like, for example, but is not limited to this.

Figure 2B:
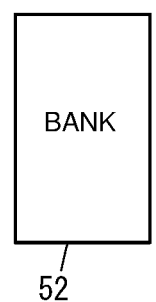

The capacity of the nonvolatile memory (not shown in the drawings) included in the second electronic control unit 16B is relatively low. FIG. 2B schematically illustrates an example of a configuration of the nonvolatile memory included in the second electronic control unit 16B. The second electronic control unit 16B includes only one nonvolatile memory chip, for example. A bank 52 is formed by the one memory chip. The second electronic control unit 16B includes only one bank 52. Such a configuration is referred to as a single bank. In the second electronic control unit 16B, in a state where the second old-version software is installed in the memory chip, it is not possible to install the second new-version software in this memory chip. In this way, the second electronic control unit 16B does not include a storage-capable region in which the second new-version software can be installed in the background.

As described above, the first electronic control unit 16A includes a storage-capable region in which the first new-version software can be installed in the background. In other words, the first electronic control unit 16A includes the second bank 50B in which the first new-version software can be installed in the background. Therefore, the first new-version software can be installed in the first electronic control unit 16A while the vehicle 10 is travelling.

As described above, the second electronic control unit 16B does not include a storage-capable region in which the second new-version software can be installed in the background. Therefore, the second new-version software cannot be installed in the second electronic control unit 16B while the vehicle 10 is travelling. Accordingly, the update control section 30 performs the installation of the second new-version software in the second electronic control unit 16B when the vehicle 10 is stopped. In other words, the update control section 30 installs the second new-version software in the second electronic control unit 16B when the main power source of the vehicle 10 is OFF. That is, the update control section 30 installs the second new-version software in the second electronic control unit 16B when the ignition switch 18 is OFF. Even when the ignition switch 18 is OFF, the power can be suitably supplied to the software updating apparatus 12, the communicating section 14, the electronic control units 16, and the like from the battery 20 and the like.

As described above, the first new-version software can be installed in the first electronic control unit 16A even while the vehicle 10 is travelling. From the viewpoint of shortening the time during which the user cannot use the vehicle 10, the following process is preferably performed for the first electronic control unit 16A in which the first new-version software can be installed while the vehicle 10 is travelling.

Specifically, the first new-version software is preferably installed in the first electronic control unit 16A in advance while the vehicle 10 is travelling. Thus, in the present embodiment, the update control section 30 installs the first new-version software in the first electronic control unit 16A while the vehicle 10 is travelling, for example, in the background. That is, the update control section 30 installs the first new-version software in the first electronic control unit 16A prior to installation of the second new-version software in the second electronic control unit 16B. As an example, the first new-version software is installed in the second bank 50B when the first old-version software is installed in the first bank 50A. The activation of the first new-version software installed in the first electronic control unit 16A is not performed while the vehicle 10 is travelling. The activation means making it possible to perform a function provided to the electronic control unit or the like during a first startup or after an initialization of this electronic control unit or the like.

As described above, the installation of the second new-version software in the second electronic control unit 16B is performed when the vehicle 10 is stopped. The update control section 30 performs a process such as described below after the installation of the second new-version software in the second electronic control unit 16B has been completed. That is, the update control section 30 performs the activation of the first new-version software installed in the first electronic control unit 16A and the activation of the second new-version software installed in the second electronic control unit 16B. That is, the update control section 30 performs the activation of the second new-version software installed in the second electronic control unit 16B, in parallel with the activation of the first new-version software installed in the first electronic control unit 16A. The update control section 30 may perform the activation of the second new-version software installed in the second electronic control unit 16B, after the activation of the first new-version software installed in the first electronic control unit 16A is completed. Otherwise, the update control section 30 may perform the activation of the first new-version software installed in the first electronic control unit 16A, after the activation of the second new-version software installed in the second electronic control unit 16B is completed. Incidentally, a process such as described below may be started at a timing at which it has been found that the activation of the first new-version software installed in the first electronic control unit 16A will be completed. That is, at such a timing, the activation of the second new-version software installed in the second electronic control unit 16B may be started. Incidentally, a process such as described below may be started at a timing at which it has been found that the activation of the second new-version software installed in the second electronic control unit 16B will be completed. That is, at such a timing, the activation of the first new-version software installed in the first electronic control unit 16A may be started.

In this way, in the present embodiment, the installation of the first new-version software in the first electronic control unit 16A is performed while the vehicle 10 is travelling, in the background. After this, the installation of the second new-version software in the second electronic control unit 16B is performed while the vehicle 10 is stopped. After the installation of the software in the second electronic control unit 16B has been completed, a process such as described below is performed. That is, the activation of the first new-version software installed in the first electronic control unit 16A and the activation of the second new-version software installed in the second electronic control unit 16B are performed. According to the present embodiment, since the first new-version software is installed in the first electronic control unit 16A while the vehicle 10 is travelling, the time during which the user cannot use the vehicle 10 can be shortened.

If the installation of the second new-version software in the second electronic control unit 16B has not been completed normally, the update control section 30 performs a rollback process for the second electronic control unit 16B. Specifically, if the installation of the second new-version software in the second electronic control unit 16B has not been completed normally, the update control section 30 performs a process to return the software of the second electronic control unit 16B to the state prior to the update. In such a case, the update control section 30 does not activate the first new-version software installed in the first electronic control unit 16A.

If the activation of the second new-version software installed in the second electronic control unit 16B has not been completed normally, the update control section 30 performs the rollback process for the second electronic control unit 16B. Specifically, if the activation of the second new-version software installed in the second electronic control unit 16B has not been completed normally, the update control section 30 performs a process to return the software of the second electronic control unit 16B to the state prior to the update. In such a case, the update control section 30 does not activate the first new-version software installed in the first electronic control unit 16A.

The time margin determining section 32 can determine whether there is enough time to perform a retry process for the installation of the new-version software. The time margin determining section 32 can determine whether there is enough time to perform the retry process based on the current timing, the time needed for the retry process, and a scheduled timing at which the vehicle 10 is to be started up. The scheduled timing at which the vehicle 10 is to be started up can be determined by the scheduled startup timing determining section 36. That is, the scheduled startup timing of the vehicle 10, can be determined by the scheduled startup timing determining section 36.

In a case where the installation of the second new-version software in the second electronic control unit 16B has not been completed normally and the time margin determining section 32 determines that there is enough time, the update control section 30 performs a process such as described below. Specifically, in such a case, the update control section 30 performs the retry process for the installation of the second new-version software in the second electronic control unit 16B.

The battery 20 includes a voltage sensor (not shown in the drawings), a temperature sensor (not shown in the drawings), and a current sensor (not shown in the drawings). Signals output respectively from these sensors included in the battery 20 are supplied to the software updating apparatus 12. The power amount determining section 34 determines the state of charge (SOC) of the battery 20, based on the signals supplied from the battery 20. The power amount determining section 34 determines whether or not the power amount secured in the battery 20 is sufficient. More specifically, the power amount determining section 34 determines whether or not the power amount secured in the battery 20 is sufficient for software update. The power amount determining section 34 determines whether or not the power amount secured in the battery 20 is sufficient, based on the time required for the software update, the power consumed when updating the software, and the power amount secured in the battery 20. When the power amount determining section 34 determines that the power amount secured in the battery 20 is sufficient, the update control section 30 can start the software update.

If the activation of the first new-version software installed in the first electronic control unit 16A has been completed normally, the update control section 30 performs a shutdown process on the first electronic control unit 16A. If the activation of the second new-version software installed in the second electronic control unit 16B has been completed normally, the update control section 30 performs a shutdown process on the second electronic control unit 16B.

The update control section 30 can perform the software update for the first electronic control unit 16A such that the first electronic control unit 16A in which the first new-version software is installed can operate as described below. The update control section 30 performs the software update such that the first electronic control unit 16A can selectively execute operational logic (source code, program code, or program code logic) of the first new-version software and operational logic of the first old-version software.

As described above, the first old-version software is installed in the first bank 50A. In such a state, the first new-version software is installed in the second bank 50B. The first new-version software is installed in the second bank 50B in the state where the first old-version software is installed in the first bank 50A, and therefore the first electronic control unit 16A can operate as described below. Specifically, the first electronic control unit 16A can selectively execute the operational logic of the first old-version software, which is the software before the update, and the operational logic of the first new-version software, which is the software after the update. The first new-version software may be capable of realizing not only the operational logic of the first new-version software, but also the operational logic of the first old-version software.

The scheduled startup timing determining section 36 stores information such as shown below in the storage section 26, every time the vehicle 10 stops. That is, the scheduled startup timing determining section 36 stores information such as shown below in the storage section 26, every time the main power source of the vehicle 10 is turned OFF. The scheduled startup timing determining section 36 stores, in the storage section 26, a date on which the vehicle 10 is stopped, a day of the week on which the vehicle 10 is stopped, a timing at which the stopping of the vehicle 10 is started, a timing at which the stopped vehicle 10 is started up, a location where the vehicle 10 is stopped, and the like. The scheduled startup timing determining section 36 determines the scheduled startup timing of the stopped vehicle 10, based on these pieces of information. The scheduled startup timing determining section 36 determines the scheduled startup timing of the vehicle 10 that is currently stopped, based on the current position of the vehicle 10, the current timing, and the like, for example. The vehicle 10 includes a GNSS (Global Navigation Satellite System) sensor (not shown in the drawings), for example. The scheduled startup timing determining section 36 can detect the current position of the vehicle 10 based on information supplied from the GNSS sensor. For example, in a case where the current position of the vehicle 10 is within a site at home and the current timing is 21:00, for example, the scheduled startup timing determining section 36 can determine that the vehicle 10 will be started up at 7:00, for example, on the following morning. The scheduled startup timing determining section 36 may be realized using artificial intelligence (AI) technology.

If it is predicted that software update will be completed before the scheduled startup timing determined by the scheduled startup timing determining section 36, the update control section 30 starts the following process. More specifically, if it is predicted that the software update will be completed by a timing that is a prescribed time before the scheduled startup timing determined by the scheduled startup timing determining section 36, the update control section 30 starts the following process. That is, in such a case, the update control section 30 starts installing the second new-version software for the second electronic control unit 16B.

A display screen concerning the software update or the like can be displayed in the display section 21. The display section 21 is a touch screen, for example, but is not limited to this. The user can perform manipulation input to the software updating apparatus 12 by manipulating the touch screen, for example. As an example, the user can indicate the intent to agree to the software update by manipulating the touch screen.

Figure 3:
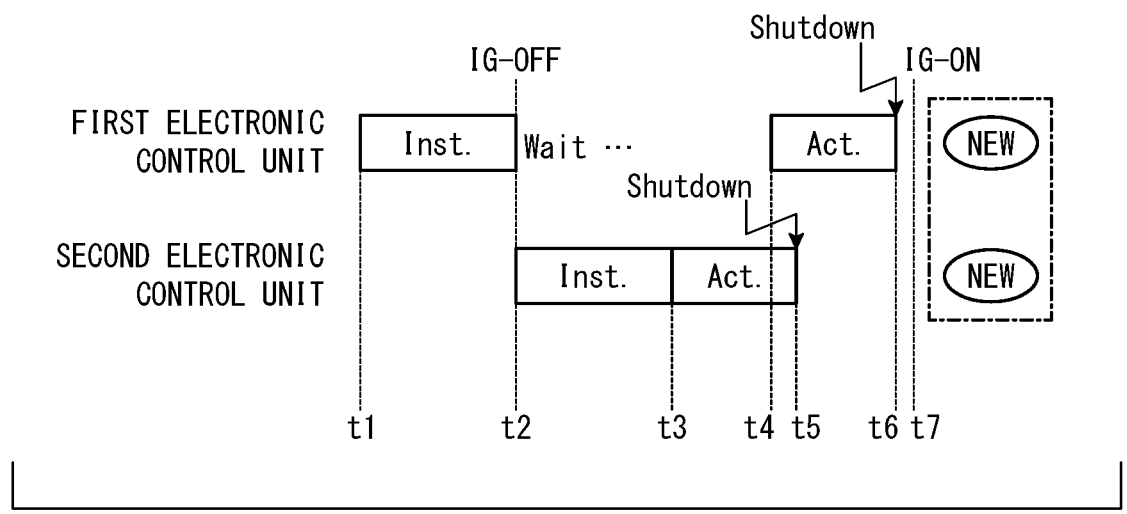
FIG. 3 is a timing chart showing an example of an operation of the software updating apparatus according to the embodiment.

FIG. 3 is a timing chart illustrating an example of an operation of the software updating apparatus according to the present embodiment.

As shown in FIG. 3, at a timing t1, the installation of the first new-version software is started. At the timing t1, the ignition switch 18 is ON and the vehicle 10 is travelling. In this way, the installation of the first new-version software in the first electronic control unit 16A is performed in a state where the ignition switch 18 is ON. In other words, the installation of the first new-version software in the first electronic control unit 16A is performed while the vehicle 10 is travelling. At this time, the installation of the second new-version software in the second electronic control unit 16B is not performed.

At a timing t2, the ignition switch 18 is turned OFF. In other words, the vehicle 10 is stopped at the timing t2. When the ignition switch 18 is turned OFF, the installation of the second new-version software in the second electronic control unit 16B is started. At this stage, the activation of the first new-version software installed in the first electronic control unit 16A is not performed.

At a timing t3, the installation of the second new-version software in the second electronic control unit 16B is completed. When the installation of the second new-version software in the second electronic control unit 16B is completed, the activation of the second new-version software installed in the second electronic control unit 16B is started.

When the activation of the second new-version software installed in the second electronic control unit 16B is performed, the update control section 30 determines whether it is predicted that the activation will be completed normally. If it is found that the activation will be normally completed, the update control section 30 performs a process such as described below. That is, at a timing t4, the update control section 30 starts activating the first new-version software installed in the first electronic control unit 16A. After the activation of the second new-version software is started and before it is found that the activation of the second new-version software will be completed normally, the activation of the first new-version software may be started.

At a timing t5, the activation of the second new-version software installed in the second electronic control unit 16B is completed. When the activation of the second new-version software installed in the second electronic control unit 16B is completed normally, the update control section 30 performs the shutdown process on the second electronic control unit 16B.

At a timing t6, the activation of the first new-version software installed in the first electronic control unit 16A is completed. When the activation of the first new-version software installed in the first electronic control unit 16A is completed normally, the update control section 30 performs the shutdown process on the first electronic control unit 16A.

At a timing t7, the ignition switch 18 is turned ON. From the timing t7 onward, the first electronic control unit 16A operates based on the first new-version software, and the second electronic control unit 16B operates based on the second new-version software. From the timing t7 onward, the first electronic control unit 16A that operates based on the first new-version software and the second electronic control unit 16B that operates based on the second new-version software, perform a cooperative operation (synchronous operation).

Figure 4:
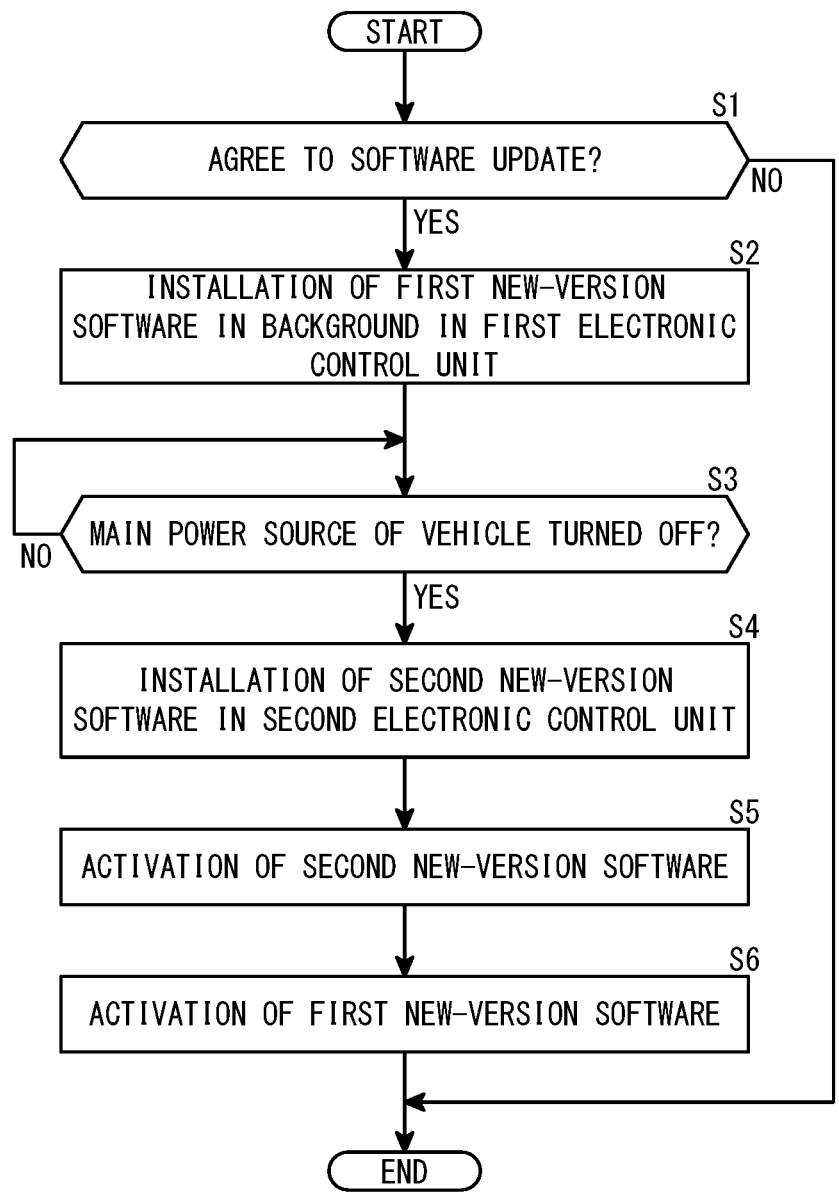
FIG. 4 is a flowchart showing an example of an operation of the software updating apparatus according to the embodiment.

FIG. 4 is a flow chart illustrating an example of an operation of the software updating apparatus according to the embodiment.

At step S1, the update control section 30 displays, in the display section 21, a display screen for making an inquiry to the user about whether he or she agrees to the software update. Step S1 is performed in a state where the main power source of the vehicle 10 is ON. The user can indicate the intent with regard to agreeing to the software update by manipulating the touch screen included in the display section 21, for example. If the user agrees to the software update (YES at step S1), the process moves to step S2. If the user does not agree to the software update (NO at step S1), the process shown in FIG. 4 is completed.

At step S2, the update control section 30 installs the first new-version software in the first electronic control unit 16A, in the background. After this, the process moves to step S3.

At step S3, the update control section 30 determines whether the main power source of the vehicle 10 is turned OFF. In other words, the update control section 30 determines whether the ignition switch 18 is turned OFF. If the main power source of the vehicle 10 is turned OFF (YES at step S3), the process moves to step S4. If the main power source of the vehicle 10 is ON (NO at step S3), step S3 is repeated.

At step S4, the update control section 30 installs the second new-version software in the second electronic control unit 16B. After this, the process moves to step S5.

At step S5, the update control section 30 activates the second new-version software installed in the second electronic control unit 16B. After this, the process moves to step S6.

At step S6, the update control section 30 activates the first new-version software installed in the first electronic control unit 16A. In this way, the process shown in FIG. 4 is completed.

Figure 5:
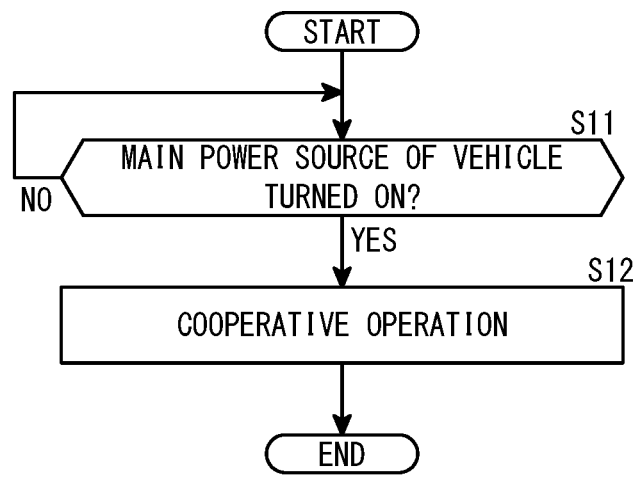
FIG. 5 is a flowchart showing an example of an operation of the software updating apparatus according to the embodiment.

FIG. 5 is a flow chart illustrating an example of an operation of the software updating apparatus according to the present embodiment. The process shown in FIG. 5 can be performed after the process shown in FIG. 4 is completed.

At step S11, the update control section 30 determines whether the main power source of the vehicle 10 is turned ON. If the main power source of the vehicle 10 is turned ON (YES at step S11), the process moves to step S12. If the main power source of the vehicle 10 is OFF (NO at step S11), step S11 is repeated.

At step S12, the update control section 30 causes the first electronic control unit 16A and the second electronic control unit 16B to start operating cooperatively. The first electronic control unit 16A executes the operational logic of the first new-version software, and the second electronic control unit 16B executes the operational logic of the second new-version software. In this way, the process shown in FIG. 5 is completed.

Figure 6:
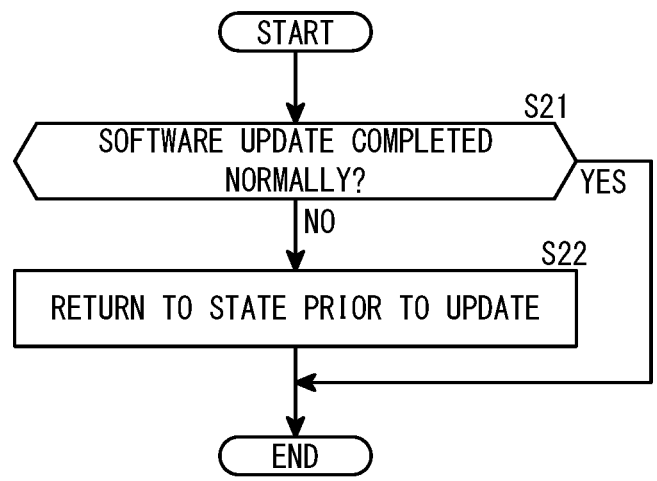
FIG. 6 is a flowchart showing an example of an operation of the software updating apparatus according to the embodiment.

FIG. 6 is a flow chart illustrating an example of an operation of the software updating apparatus according to the present embodiment. The process shown in FIG. 6 can be performed after the software update is performed.

At step S21, the update control section 30 determines whether the software update has been completed normally. If the software update has been completed normally (YES at step S21), the process shown in FIG. 6 is completed. On the other hand, if the software update has not been completed normally (NO at step S21), the process moves to step S22.

At step S22, the update control section 30 returns the software to the state prior to the update. For example, if the software update using the second new-version software has not been performed normally in the second electronic control unit 16B, the update control section 30 returns the software of the second electronic control unit 16B to the state prior to the update. In this way, the process shown in FIG. 6 is completed.

Figure 7:
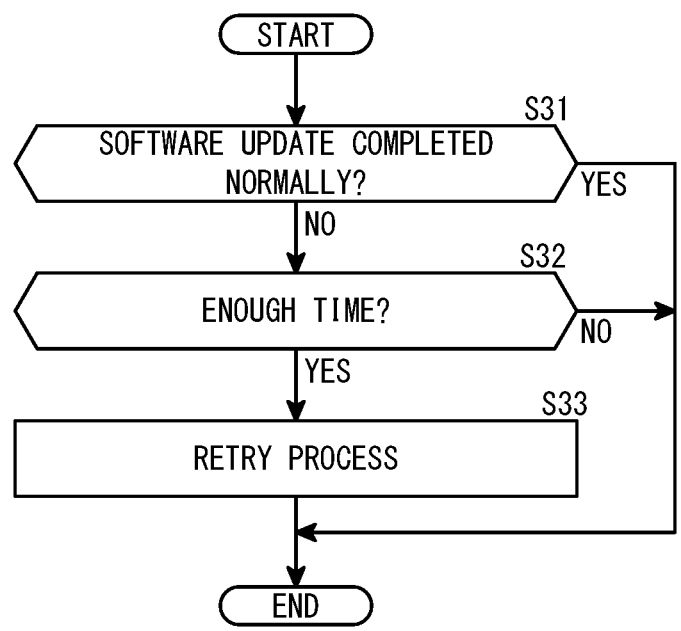
FIG. 7 is a flowchart showing an example of an operation of the software updating apparatus according to the embodiment.

FIG. 7 is a flow chart illustrating an example of an operation of the software updating apparatus according to the present embodiment. The process shown in FIG. 7 can be performed after the software update is performed.

At step S31, the update control section 30 determines whether the software update has been completed normally. If the software update has been completed normally (YES at step S31), the process shown in FIG. 7 is completed. On the other hand, if the software update has not been completed normally (NO at step S31), the process moves to step S32.

At step S32, the time margin determining section 32 determines whether there is enough time to perform the retry process for the installation of the new-version software. If there is enough time to perform the retry process for the installation of the new-version software (YES at step S32), the process moves to step S33. If there is not enough time to perform the retry process for the installation of the new-version software (NO at step S32), the process shown in FIG. 7 is completed.

At step S33, the update control section 30 performs the retry process for the installation of the new-version software. In this way, the process shown in FIG. 7 is completed.

Figure 8:
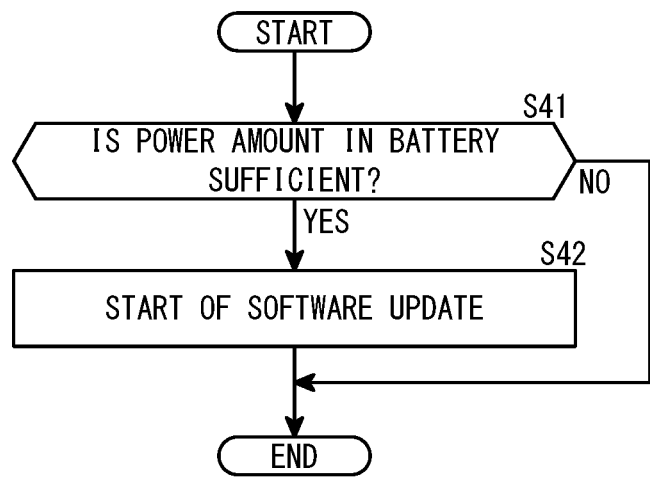
FIG. 8 is a flowchart showing an example of an operation of the software updating apparatus according to the embodiment.

FIG. 8 is a flow chart illustrating an example of an operation of the software updating apparatus according to the present embodiment. The process shown in FIG. 8 can be performed before the software update is performed.

At step S41, the power amount determining section 34 determines whether or not the power amount secured in the battery 20 is sufficient. More specifically, the power amount determining section 34 determines whether or not the power amount secured in the battery 20 is sufficient for the software update. If the power amount determining section 34 determines that the power amount secured in the battery 20 is sufficient for the software update (YES at step S41), the process moves to step S42. If the power amount determining section 34 determines that the power amount secured in the battery 20 is not sufficient for the software update (NO at step S41), the process illustrated in FIG. 8 is completed.

At step S42, the update control section 30 starts updating the software. In this way, the process shown in FIG. 8 is completed.

Figure 9:
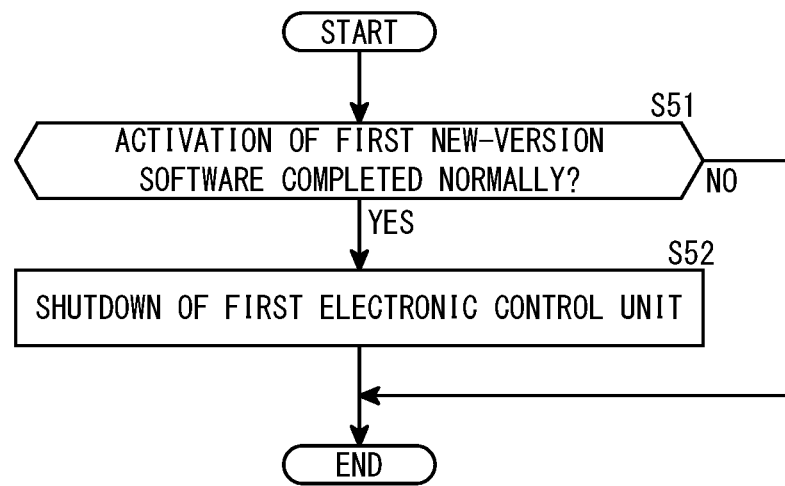
FIG. 9 is a flowchart showing an example of an operation of the software updating apparatus according to the embodiment.

FIG. 9 is a flowchart showing an example of an operation of the software updating apparatus according to the present embodiment. The process shown in FIG. 9 can be performed after the activation of the first new-version software for the first electronic control unit 16A has been completed.

At step S51, a determination is made as to whether the activation of the first new-version software for the first electronic control unit 16A has been completed normally. If the activation of the first new-version software for the first electronic control unit 16A has been completed normally (YES at step S51), the process moves to step S52. If the activation of the first new-version software for the first electronic control unit 16A has not been completed normally (NO at step S51), the process shown in FIG. 9 is completed.

At step S52, the update control section 30 performs the shutdown process on the first electronic control unit 16A. In this way, the process shown in FIG. 9 is completed.

Figure 10:
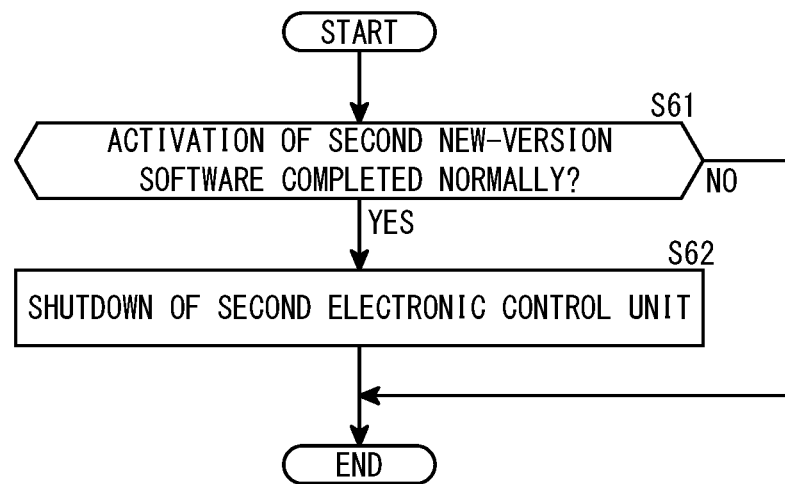
FIG. 10 is a flowchart showing an example of an operation of the software updating apparatus according to the embodiment.

FIG. 10 is a flow chart illustrating an example of an operation of the software updating apparatus according to the present embodiment. The process shown in FIG. 10 may be executed after the activation of the second electronic control unit 16B is completed.

At step S61, a determination is made as to whether the activation of the second new-version software for the second electronic control unit 16B has been completed normally. If the activation of the second new-version software for the second electronic control unit 16B has been completed normally (YES at step S61), the process moves to step S62. If the activation of the second new-version software for the second electronic control unit 16B has not been completed normally (NO at step S61), the process shown in FIG. 10 is completed.

At step S62, the update control section 30 performs the shutdown process on the second electronic control unit 16B. In this way, the process shown in FIG. 10 is completed.

Figure 11:
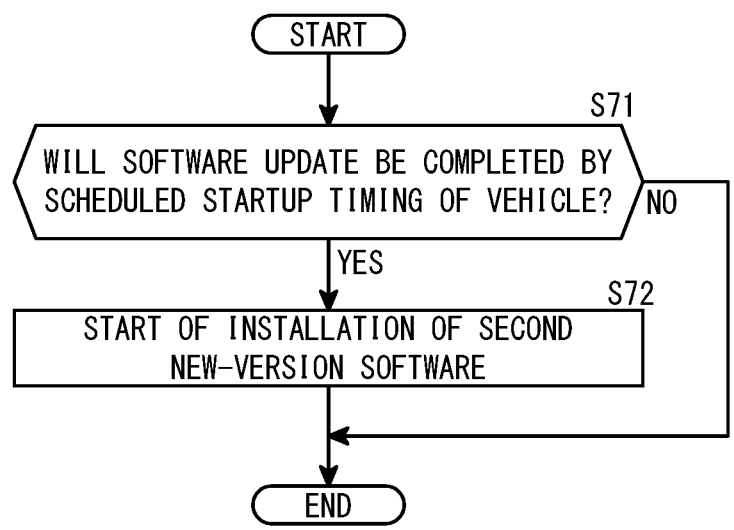
FIG. 11 is a flowchart showing an example of an operation of the software updating apparatus according to the embodiment.

FIG. 11 is a flow chart illustrating an example of an operation of the software updating apparatus according to the present embodiment. The process shown in FIG. 11 can be performed before the installation of the software in the second electronic control unit 16B is started, for example.

At step S71, the update control section 30 determines whether the software update will be completed by the scheduled startup timing of the vehicle 10. More specifically, the update control section 30 determines whether the activation of the first new-version software and the activation of the second new-version software will be completed by a timing that is a prescribed time before the scheduled startup timing of the vehicle 10. If it is predicted that the software update will be completed by the scheduled startup timing of the vehicle 10 (YES at step S71), the process moves to step S72. If it is predicted that the software update will not be completed by the scheduled startup timing of the vehicle 10 (NO at step S71), the process shown in FIG. 11 is completed.

At step S72, the update control section 30 starts installing the second new-version software in the second electronic control unit 16B. In this way, the process shown in FIG. 11 is completed.

In this way, in the present embodiment, the installation of the first new-version software in the first electronic control unit 16A is performed while the vehicle 10 is travelling. After this, the installation of the second new-version software in the second electronic control unit 16B is performed when the main power source of the vehicle 10 is OFF. That is, the second new-version software is installed in the second electronic control unit 16B when the ignition switch 18 is OFF. After the installation of the software in the second electronic control unit 16B has been completed, a process such as described below is performed. That is, the activation of the first new-version software installed in the first electronic control unit 16A and the activation of the second new-version software installed in the second electronic control unit 16B are performed. According to the present embodiment, since the first new-version software is installed in the first electronic control unit 16A while the vehicle 10 is travelling, the time during which the user cannot use the vehicle 10 can be shortened. In this way, according to the present embodiment, it is possible to update software more favorably.

Modified Embodiments

While the preferred embodiments of the present invention have been described above, the technical scope of the invention is not limited to the above described embodiments, and various alterations and improvements can be made without deviating from the gist of the present invention.

For example, in the above-described embodiment, an example is described of a case where the second electronic control unit 16B does not include a storage-capable region in which the second new-version software can be installed in the background was described, but the present invention is not limited to this. The second electronic control unit 16B may include a storage-capable region in which the second new-version software can be installed in the background.

The following is a summary of the embodiments described above.

The software updating apparatus (12) includes: the acquiring section (28) configured to acquire new-version software supplied via the network (25); and the update control section (30) configured to perform a software update for each of the plurality of electronic control units (16A, 16B) mounted in the vehicle (10), using the new-version software acquired by the acquiring section, wherein the first electronic control unit (16A) among the plurality of electronic control units includes a storage-capable region in which first new-version software, for updating first old-version software installed in the first electronic control unit, is allowed to be installed in a background, and wherein the update control section performs installation of the first new-version software in the storage-capable region of the first electronic control unit in the background before installation of second new-version software in a second electronic control unit (16B) among the plurality of electronic control units, and after the activation of the second new-version software installed in the second electronic control unit is started or after it is found that the activation of the second new-version software installed in the second electronic control unit will be completed normally, the update control section activates the first new-version software installed in the storage-capable region of the first electronic control unit. According to such a configuration, the installation of the first new-version software in the first electronic control unit is performed in the background before the installation of the second new-version software in the second electronic control unit. Therefore, according to such a configuration, it is possible to shorten the time during which the user cannot use the vehicle. In this way, according to such a configuration, it is possible to update software more favorably.

The second electronic control unit need not necessarily include a storage-capable region in which the second new-version software is allowed to be installed in the background.

If the installation of the second new-version software in the second electronic control unit or the activation of the second new-version software installed in the second electronic control unit has not been completed normally, the update control section performs a rollback process on the second electronic control unit and need not necessarily activate the first new-version software installed in the storage-capable region of the first electronic control unit. According to such a configuration, if the installation or activation of the second new-version software for the second electronic control unit cannot be performed normally, it is possible to return the software of the second electronic control unit to the state prior to the update.

The update control section may be included in the vehicle.

The software updating apparatus may further include the time margin determining section (32) configured to determine whether there is enough time, wherein if installation of the new-version software in any one of the electronic control units has not been completed normally and the time margin determining section determines that there is enough time, the update control section may perform a retry process for the installation of the new-version software in the electronic control unit. According to such a configuration, even if the installation of the new-version software in the electronic control unit was unable to be performed normally, it is possible to install the new-version software in the electronic control unit by using the retry process.

The software updating apparatus may further include the power amount determining section (34) configured to determine whether an amount of power secured in the battery (20) that is included in the vehicle is sufficient, wherein if the power amount determining section determines that the amount of power secured in the battery is sufficient, the update control section may start the software update. According to such a configuration, since the software is not updated when the amount of electric power secured in the battery is not sufficient, it is possible to prevent a problem from occurring.

If the activation of the first new-version software installed in the storage-capable region of the first electronic control unit has been completed normally, the update control section may perform a shutdown process on the first electronic control unit, and if the activation of the second new-version software installed in the second electronic control unit has been completed normally, the update control section may perform a shutdown process on the second electronic control unit. According to such a configuration, since the shutdown process is performed on the electronic control unit when the software update has been completed normally, power saving can be realized.

The update control section may perform the installation of the first new-version software in the storage-capable region of the first electronic control unit while the vehicle is travelling. According to such a configuration, it is possible to reliably shorten the time during which the user cannot use the vehicle.

The first electronic control unit may be an electronic control unit that has a display control function. The electronic control unit that has a display control function includes a high-capacity memory chip.

The first electronic control unit may be an electronic control unit for in-vehicle infotainment. The electronic control unit for in-vehicle infotainment includes a high-capacity memory chip.

The update control section may perform the software update for the first electronic control unit in a manner that, after the software update has been performed, the first electronic control unit is allowed to selectively execute operational logic of the first new-version software and operational logic of the first old-version software. According to such a configuration, if the first electronic control unit in which the first new-version software has been installed and the second electronic control unit in which the second new-version software has been installed cannot operate cooperatively in a favorable manner, it is possible to perform the following. In such a case, the update control section returns the software of the second electronic control unit to the state prior to the update and causes the first electronic control unit to execute the operational logic of the first old-version software. Thereby, the first electronic control unit and the second electronic control unit can perform a cooperative operation.

The software updating apparatus may further include the scheduled startup timing determining section (36) configured to determine a scheduled startup timing, which is a timing at which the vehicle is scheduled to be started up, wherein if the activation of the first new-version software is predicted to be completed by the scheduled startup timing determined by the scheduled startup timing determining section, the update control section may start installing the second new-version software in the second electronic control unit. According to such a configuration, if the software update cannot be completed by the scheduled startup timing of the vehicle, the software update for the second electronic control unit is not started. Therefore, it is possible to prevent the occurrence of a situation where the user cannot use the vehicle.

The update control section may perform the installation of the second new-version software in the second electronic control unit when a main power source of the vehicle is OFF.

The update control section may perform the activation of the second new-version software installed in the second electronic control unit, in parallel with the activation of the first new-version software installed in the first electronic control unit. According to such a configuration, it is possible to shorten the time needed to perform the software update.

The software updating apparatus includes: the acquiring section configured to acquire new-version software supplied via the network; and the update control section configured to perform a software update for each of the plurality of electronic control units included in the vehicle, using the new-version software acquired by the acquiring section, wherein the first electronic control unit among the plurality of electronic control units includes a storage-capable region in which first new-version software, for updating first old-version software installed in the first electronic control unit, is allowed to be installed in a background, wherein the second electronic control unit among the plurality of electronic control units does not include a storage-capable region in which second new-version software, for updating second old-version software installed in the second electronic control unit, is allowed to be installed in the background, and wherein when a main power source of the vehicle is ON, the update control section performs installation of the first new-version software in the storage-capable region of the first electronic control unit in the background, and then, when installation of the first new-version software in the storage-capable region of the first electronic control unit has been completed and the main power source of the vehicle is turned OFF, the update control section performs the installation of the second new-version software in the second electronic control unit, and then, after the installation of the second new-version software in the second electronic control unit has been completed, the update control section activates the first new-version software installed in the storage-capable region of the first electronic control unit and the second new-version software installed in the second electronic control unit. According to such a configuration, the installation of the first new-version software in the first electronic control unit is performed in the background before the installation of the second new-version software in the second electronic control unit. Therefore, according to such a configuration, it is possible to shorten the time during which the user cannot use the vehicle.

The vehicle (10) includes the software updating apparatus such as described above.

The software updating method for performing a software update for each of the plurality of electronic control units included in the vehicle, by using new-version software supplied via the network, wherein the first electronic control unit among the plurality of electronic control units includes a storage-capable region in which first new-version software, for updating first old-version software installed in the first electronic control unit, is allowed to be installed in a background, includes: the step (S2) of installing the first new-version software in the storage-capable region of the first electronic control unit in the background; the step (S3, S4) of installing, when the installation of the first new-version software in the storage-capable region of the first electronic control unit has been completed and a main power source of the vehicle is turned OFF, second new-version software in a second electronic control unit among the plurality of electronic control units; and the step (S5, S6) of activating, after activation of the second new-version software installed in the second electronic control unit is started or after it is found that the activation of the second new-version software installed in the second electronic control unit will be completed normally, the first new-version software installed in the storage-capable region of the first electronic control unit.

REFERENCE SIGNS LIST

10: vehicle
11: software updating system
12: software updating apparatus
14, 40: communicating section
16A, 16B: electronic control unit
18: ignition switch
20: battery
21: display section
22: server
24: computing section
25: network
26: storage section
28: acquiring section
30: update control section
32: time margin determining section
34: power amount determining section
36: scheduled startup timing determining section
38: database

The invention claimed is:
1. A software updating apparatus comprising a central processing unit including:
   an acquiring section configured to acquire new-version software supplied via a network; and
   an update control section configured to perform a software update for each of first and second electronic control units mounted in a vehicle, using the new-version software acquired by the acquiring section, wherein the first electronic control unit operated by first old-version software includes a storage-capable region in which first new-version software is allowed to be installed in a background, wherein the second electronic control unit operated by second old-version software does not include the storage-capable region in which second new-version software is allowed to be installed in the background, and wherein the update control section performs installation of the first new-version software in the storage-capable region in the first electronic control unit in the background before the installation of the second new-version software in the second electronic control unit, and the update control section activates the first new-version software installed in the storage-capable region of the first electronic control unit after activation of the second new-version software installed in the second electronic control unit is started or after having determined that the activation of the second new-version software installed in the second electronic control unit will be completed normally.

2. The software updating apparatus according to claim 1, wherein if the installation of the second new-version software in the second electronic control unit or the activation of the second new-version software installed in the second electronic control unit has not been completed normally, the update control section performs a rollback process on the second electronic control unit and does not activate the first new-version software installed in the storage-capable region of the first electronic control unit.

3. The software updating apparatus according to claim 1, wherein the update control section is included in the vehicle.

4. The software updating apparatus according to claim 1, further comprising a time margin determining section configured to determine whether there is enough time, wherein if installation of the second new-version software in the second electronic control unit has not been completed normally and the time margin determining section determines that there is enough time, the update control section performs a retry process for the installation of the second new-version software in the second electronic control unit.

5. The software updating apparatus according to claim 1, wherein the central processing unit further includes a power amount determining section configured to determine whether an amount of power secured in a battery that is included in the vehicle is sufficient, wherein if the power amount determining section determines that the amount of power secured in the battery is sufficient, the update control section starts the software update.

6. The software updating apparatus according to claim 1, wherein if the activation of the first new-version software installed in the storage-capable region of the first electronic control unit has been completed normally, the update control section performs a shutdown process on the first electronic control unit, and if the activation of the second new-version software installed in the second electronic control unit has been completed normally, the update control section performs a shutdown process on the second electronic control unit.

7. The software updating apparatus according to claim 1, wherein the update control section performs the installation of the first new-version software in the storage-capable region of the first electronic control unit while the vehicle is travelling.

8. The software updating apparatus according to claim 1, wherein the first electronic control unit is an electronic control unit that has a display control function.

9. The software updating apparatus according to claim 8, wherein the electronic control unit that has the display control function is an electronic control unit for in-vehicle infotainment.

10. The software updating apparatus according to claim 1, wherein the update control section performs the software update for the first electronic control unit in a manner that, after the software update has been performed, the first electronic control unit is allowed to selectively execute operational logic of the first new-version software and operational logic of the first old-version software.

11. The software updating apparatus according to claim 1, further comprising a scheduled startup timing determining section configured to determine a scheduled startup timing, which is a timing at which the vehicle is scheduled to be started up, wherein if the activation of the first new-version software is predicted to be completed by the scheduled startup timing determined by the scheduled startup timing determining section, the update control section starts installing the second new-version software in the second electronic control unit.

12. The software updating apparatus according to claim 1, wherein the update control section performs the installation of the second new-version software in the second electronic control unit when a main power source of the vehicle is OFF.

13. The software updating apparatus according to claim 1, wherein the update control section performs the activation of the second new-version software installed in the second electronic control unit, in parallel with the activation of the first new-version software installed in the first electronic control unit.

14. A software updating apparatus comprising a central processing unit including:

an acquiring section configured to acquire new-version software supplied via a network; and an update control section configured to perform a software update for each of first and second electronic control units included in a vehicle, using the new-version software acquired by the acquiring section, wherein the first electronic control unit operated by first old-version software includes a storage-capable region in which first new-version software is allowed to be installed in a background, wherein the second electronic control unit operated by second old-version software does not include the storage-capable region in which second new-version software, for updating the second old-version software installed in the second electronic control unit, is allowed to be installed in the background, and wherein when a main power source of the vehicle is ON, the update control section performs installation of the first new-version software in the storage-capable region in the first electronic control unit in the background before the installation of the second new-version software in the second electronic control unit, and when the main power source of the vehicle is turned OFF, the update control section performs installation of the second new-version software in the second electronic control unit, and then, the update control section activates the first new-version software installed in the storage-capable region of the first electronic control unit after activation of the second new-version software installed in the second electronic control unit is started or after having determined that the activation of the second new-version software installed in the second electronic control unit will be completed normally.

15. A vehicle comprising a software updating apparatus comprising a central processing unit including:
- an acquiring section configured to acquire new-version software supplied via a network; and
- an update control section configured to perform a software update for each of first and second electronic control units mounted in the vehicle, using the new-version software acquired by the acquiring section,
- wherein the first electronic control unit operated by first old-version software includes a storage-capable region in which first new-version software is allowed to be installed in a background,
- wherein the second electronic control unit operated by second old-version software does not include the storage-capable region in which second new-version software is allowed to be installed in the background, and
- wherein the update control section performs installation of the first new-version software in the storage-capable region of the first electronic control unit in the background before installation of the second new-version software in the second electronic control unit, and the update control section activates the first new-version software installed in the storage-capable region of the first electronic control unit after activation of the second new-version software installed in the second electronic control unit is started or after having determined that the activation of the second new-version software installed in the second electronic control unit will be completed normally.

16. A software updating method for performing a software update for each of first and second electronic control units included in a vehicle, by using new-version software supplied via a network,
- wherein the first electronic control unit operated by first old-version software includes a storage-capable region in which first new-version software is allowed to be installed in a background,
- wherein the second electronic control unit operated by second old-version software does not include the storage-capable region in which second new-version software is allowed to be installed in the background, the method comprising:
- a step of installing the first new-version software in the storage-capable region of the first electronic control unit in the background;
- a step of installing, when the installation of the first new-version software in the storage-capable region of the first electronic control unit has been completed and a main power source of the vehicle is turned OFF, the second new-version software in the second electronic control unit; and
- a step of activating, the first new-version software installed in the storage-capable region of the first electronic control unit after activation of the second new-version software installed in the second electronic control unit is started or after having determined that the activation of the second new-version software installed in the second electronic control unit will be completed normally.

\* \* \* \* \*